June 5, 1962
E. M. GAMBINO
3,037,771
PLASTIC BOWLING PINS
Filed April 27, 1959
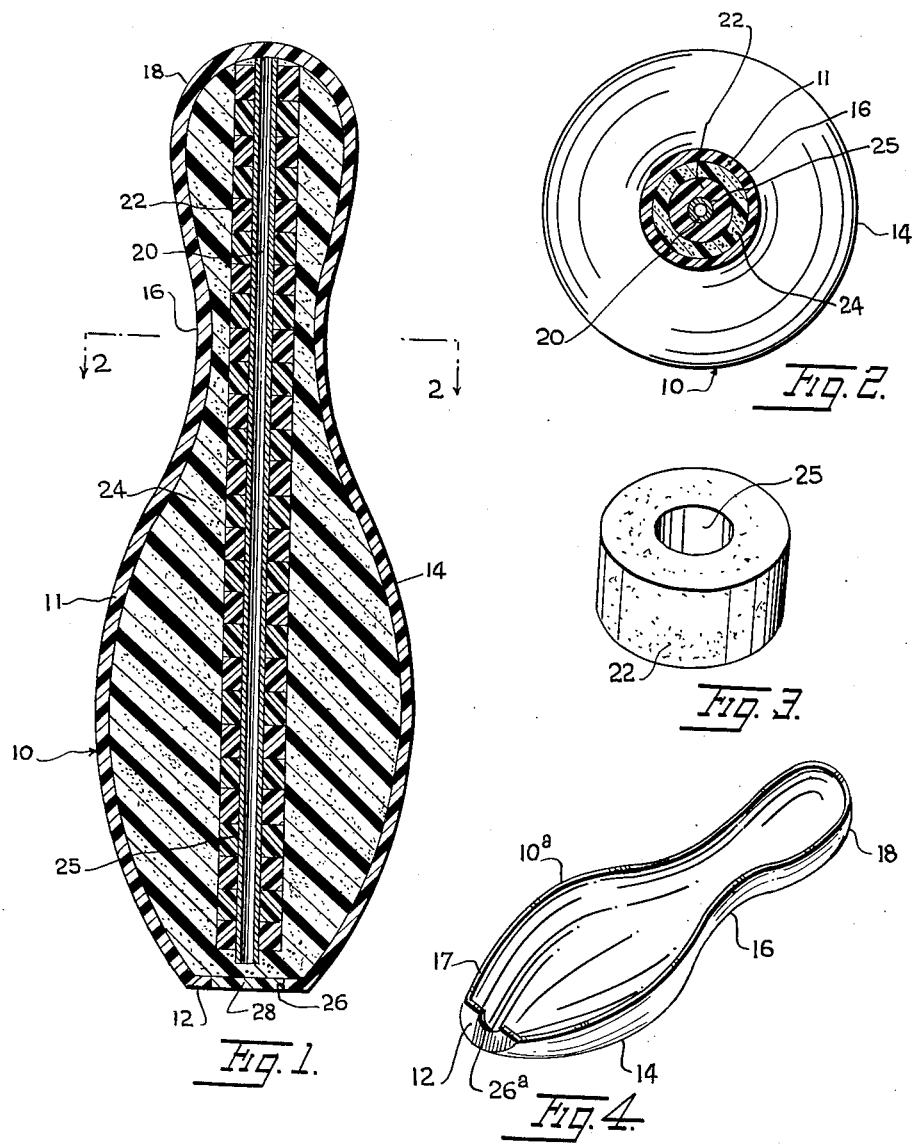
INVENTOR.
EVELYN M. GAMBINO
BY
*Zoltan Holochuk*
ATTORNEY

United States Patent Office 3,037,771
Patented June 5, 1962

3,037,771
PLASTIC BOWLING PINS
Evelyn M. Gambino, 57 Hunters Lane,
Huntington Station, N.Y.
Filed Apr. 27, 1959, Ser. No. 809,206
2 Claims. (Cl. 273—82)

This invention relates to the art of bowling pins and particularly concerns an improved bowling pin made substantially entirely of plastic material.

It is a principal object of the invention to provide an improved bowling pin which will be longer lasting than conventional wooden pins, which will have the same mechanical compliance or "bounce," weight and size as wooden pins, but which will not dent, chip, scratch or break. The improved pin will not mar or scratch the bowling floor on which it is used. It is warm and pleasant to touch and is easily cleaned.

A further object of the invention is the provision of a bowling pin which costs less to manufacture than a wooden bowling pin of comparable quality.

Another object is the provision of a bowling pin made of a molded plastic skin or shell in which is disposed a metal reinforcing rod surrounded by disks of foamed plastic material, the space between the disks and shell being filled with semiflexible material.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a longitudinal sectional view through a bowling pin embodying the invention.

FIG. 2 is a cross-sectional view taken on line 2—2 of FIG. 1.

FIG. 3 is a perspective view on an enlarged scale of a plastic foam ring employed in the pin.

FIG. 4 is a perspective view on a reduced scale of a half section of the shell of the bowling pin according to the invention.

Referring to the drawings, there is shown a bowling pin 10 having an outer shell 11 formed with the usual flat bottom 12, bulbous body 14, narrow neck 16 and rounded head or handle 18. Within the shell is an axially disposed metal tube 20 surrounded by a pile of ring shaped flat disks 22. Each disk is formed of rigid expanded cellular plastic material such as cellulose acetate, polystyrene or the like. Between the rings and the inner side of the shell is a semiflexible plastic filler 24.

In fabricating the pin, two shell halves 10a such as shown in FIG. 4 are individually molded. The molded halves are pressed together at their facing flat edges 17 and bonded by application of heat to form a complete hollow shell having only a single opening 26 at the bottom. One half of the opening is shown at 26a in FIG. 4. This opening has a diameter exceeding that of the rings 22. The shell is preferably formed of glass reinforced polyester resin which is tough, non-chipping, semiflexible material.

The metal tube 20 is axially disposed in the shell. This tube may be made of rigid aluminum, brass or copper tubing. The tube is required primarily to reinforce the narrow part of the neck which is the most fragile part. Around the tube are placed the disks 22 having central holes 25. These disks may be made of expanded foamed sheet plastic material. The disks may be cut out or stamped out of the sheet material. Their inner hole diameters equal the outer diameter of tube 20. It will be noted that the disks are not attached to each other. This is a most important feature of the invention since they contribute to the mechanical compliance of the pin so that the pin has the "bounce" characteristic of wooden pins.

The light plastic filler 24 is made of a mixture of sawdust and resin, the resin being preferably 65% rigid polyester and 35% flexible polyester. This mixture is then poured into the inverted pin through the opening 26. A disk-like plug 28 made of glass filled polyester resin is then placed in the opening 26 and the assembled pin is cured by heating until the filler sets and the plug 28 bonds to the shell.

If desired, part or all of the exterior of the pin may be painted. Generally the neck is appropriately striped. A white or other opaque colored pigment may be molded with the resin during the molding of the shell halves 25a and plug 28.

The entire bowling pin when completed is attractive in appearance. It has the look and sound, when struck by a bowling ball, of a wooden pin. Its mechanical compliance is substantially the same as that of a wooden pin. The light separate disks contribute to this effect, as do the semiflexible skin and filler.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A bowling pin comprising a semiflexible plastic shell having a hard smooth outer surface, an elongated small diameter metal tube which is axially disposed within said shell and extends from the top to the bottom thereof, a plurality of similar ring-shaped flat disks of expanded foamed plastic material which are superimposed on said tube and extended from the top to the bottom thereof in contacting non-adhering relation, and light semiflexible filler which completely fills the space between the inner surface of said shell and the outer surface of said disks, said semiflexible shell being formed of polyester resin reinforced with glass, said light semiflexible filler comprising a mixture of sawdust and a bonding resin consisting of a mixture of rigid polyester and flexible polyester.

2. A bowling pin comprising a semiflexible plastic shell having a hard smooth outer surface, an elongated small diameter metal tube which is axially disposed within said shell and extends from the top to the bottom thereof, a plurality of similar ring-shaped flat disks of expanded foamed plastic material which are superimposed on said tube and extended from the top to the bottom thereof in contacting non-adhering relation, and light semiflexible filler which completely fills the space between the inner surface of said shell and the outer surface of said disks, said light semiflexible filler comprising a mixture of sawdust and a bonding resin consisting of a mixture of rigid polyester and flexible polyester.

References Cited in the file of this patent

UNITED STATES PATENTS

| | | |
|---|---|---|
| 1,205,278 | Skalla | Nov. 21, 1916 |
| 1,583,824 | Bishop | May 11, 1926 |
| 2,202,674 | Seaman et al. | May 28, 1940 |
| 2,535,033 | Bergere | Dec. 26, 1950 |
| 2,773,792 | Nebesar | Dec. 11, 1956 |
| 2,801,199 | Meyers | July 30, 1957 |